(12) United States Patent
Daniell et al.

(10) Patent No.: US 7,181,618 B2
(45) Date of Patent: *Feb. 20, 2007

(54) SYSTEM AND METHOD FOR RECOVERING A SECURITY PROFILE OF A COMPUTER SYSTEM

(75) Inventors: William T. Daniell, Marietta, GA (US); Brian K. Daigle, Marietta, GA (US); Gary Sevounts, Atlanta, GA (US); Mitchell R. Frank, Roswell, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1128 days.

This patent is subject to a terminal disclaimer.

(21) Appl. No.: 09/760,404

(22) Filed: Jan. 12, 2001

(65) Prior Publication Data
US 2002/0095593 A1 Jul. 18, 2002

(51) Int. Cl.
*H04L 9/00* (2006.01)
(52) U.S. Cl. .................. 713/166; 713/164; 713/167; 713/187; 726/2; 726/3; 726/14
(58) Field of Classification Search ............ 713/164, 713/166, 167, 201
See application file for complete search history.

(56) References Cited

U.S. PATENT DOCUMENTS

| | | | | |
|---|---|---|---|---|
| 5,032,979 A * | 7/1991 | Hecht et al. | ............... | 713/201 |
| 5,720,033 A * | 2/1998 | Deo | ............... | 726/2 |
| 5,809,230 A * | 9/1998 | Pereira | ............... | 713/200 |
| 5,974,149 A * | 10/1999 | Leppek | ............... | 713/164 |
| 5,991,791 A | 11/1999 | Siefert | ............... | 709/100 |
| 6,055,636 A * | 4/2000 | Hillier et al. | ............... | 713/200 |
| 6,125,457 A | 9/2000 | Crisan et al. | ............... | 714/36 |
| 6,154,844 A | 11/2000 | Touboul et al. | ............... | 713/201 |
| 6,158,010 A | 12/2000 | Moriconi et al. | ............... | 713/201 |
| 6,249,868 B1 * | 6/2001 | Sherman et al. | ............... | 713/168 |
| 6,324,578 B1 * | 11/2001 | Cox et al. | ............... | 709/223 |
| 6,339,826 B2 * | 1/2002 | Hayes et al. | ............... | 713/166 |
| 6,530,024 B1 * | 3/2003 | Proctor | ............... | 713/201 |
| 6,587,876 B1 * | 7/2003 | Mahon et al. | ............... | 709/223 |
| 7,065,644 B2 * | 6/2006 | Daniell et al. | ............... | 713/166 |

\* cited by examiner

*Primary Examiner*—Syed A. Zia

(57) ABSTRACT

A system for recovering previously activated security profiles utilizes memory and a security application. Initially, the security application enables a user to define a first security profile. After defining the first security profile, the user submits a request for activating the first security profile, and in response, the security application modifies a machine state of the computer system. The modification of the machine state in response to this request locks down the computer system, thereby implementing the first security profile defined by the user. Also in response to the request for activating the first security profile, the security application stores, in the memory, data indicative of the machine state so that the first security profile can be again implemented at a later time, if desired. In this regard, after causing a different security profile to be implemented by the computer system, a user may submit a request for changing the security profile of the computer system back to the first security profile. In response to such a request, the security application retrieves the data previously stored in the memory and automatically modifies the machine state so that the first security profile is again implemented by the computer system. As a result, any changes made to the security profile of the computer system since the submission of the aforementioned request for activating the first security profile are effectively nullified.

22 Claims, 3 Drawing Sheets

SYSTEM AND METHOD FOR RECOVERING A SECURITY PROFILE OF A COMPUTER SYSTEM

BACKGROUND OF THE INVENTION

1. Field of the Invention

The present invention generally relates to computer resource security and, in particular, to a system and method for automatically implementing, within a computer system, a security profile that has been previously implemented within the computer system.

2. Related Art

To protect a computer system against vulnerabilities (e.g., attacks from hackers), the computer system is often "locked down" via a security application. As known in the art, a security application locks down a computer system by controlling a machine state or configuration of the computer system such that the computer system (e.g., an operating system within the computer system) enforces a set of security rules that prevent unauthorized users from accessing and/or modifying certain applications, files, and/or other resources within the computer system. For example, a security application may set the configuration of the computer system such that the computer system enforces a rule that restricts which users may access a particular file. In this regard, the computer system may maintain a list, commonly referred to as an access control list, that identifies which users are authorized to access and/or use various computer resources. To cause the computer system to enforce the foregoing rule, the security application modifies the access control list such that it indicates which users may access the particular file. When a user attempts to access this file, the computer system first checks the access control list to determine whether or not the user is one of the specified users that may access the file. If the user is one of the specified users, then the computer system allows the access to occur. However, if the user is not one of the specified users, then the computer system prevents the access and displays a message to the user indicating that access to the requested file has been denied.

The security application normally includes data that defines a list of security rules that may be enforced by a computer system. The security application displays this list of security rules and allows a particular user or set of users, referred to herein as the "system administrator," to select which of the rules that the system administrator would like enforced by the computer system. The security application, in turn, modifies the configuration or, in other words, the configuration of the computer system such that the computer system enforces the rules selected by the system administrator.

Note that the security application normally sets the configuration of the computer system, and the computer's operating system enforces the security rules based on the settings controlled by the security application. In other words, the security application causes the operating system to enforce the selected rules by manipulating the configuration of the computer system. Thus, once the security application has set the configuration of the computer system, the security application usually provides no further functionality in enforcing the selected rules. The security application, however, may change the computer system's settings in order to change which rules are enforced by the operating system in response to inputs for changing the security profile from the system administrator.

As described above, the system administrator selects which security rules should be enforced based on the level of security desired by the administrator, and the degree to which the computer system is locked down by the security application depends on the rules selected by the system administrator. Generally, the more rules that are enforced, the more secure the system becomes and, in other words, the more the system is locked down. Thus, if the system administrator desires to have a more secure computer system, the system administrator typically selects more rules for enforcement and/or selects particular rules that provide a particularly secure environment in an area of interest to the system administrator. However, in general, the compatibility of the computer system decreases as the security of the computer system increases. Therefore, if security is not a high priority to the system administrator, then he or she may select for enforcement fewer rules and/or rules that do not provide a high level of security, thereby reducing the degree to which the computer system is locked down.

Moreover, the degree to which the computer system is locked down by the security application depends on the competing interests of system security and system compatibility. Therefore, the rules selected for enforcement usually vary from computer system to computer system based on the desires of the system administrators in establishing the security profile of each of the computer systems. As used herein, a "security profile" refers to the collective set of rules that have been selected for locking down a computer system in order to prevent unauthorized users from accessing and/or modifying certain resources within the computer system. Security applications that set the configuration of a computer system to induce the computer system to enforce the selected security rules or that, in other words, set the security profiles of computer systems are well known in the art and are often referred to as "lock down products" or "lock down applications." Normally, a security application only allows the system administrator or a user designated by the system administrator to change the computer system's security profile.

Since the security profiles of computer systems typically vary from computer system to computer system, most security applications do not provide a standard set of security rules for implementation. In this regard, most security applications list for the system administrator each security rule that may be selected for enforcement. The system administrator then reviews the displayed list of rules and selects the rules that the administrator would like enforced by the computer system and, in other words, added to the security profile of the computer system.

Unfortunately, as the need for more secure systems has increased, the list of security rules from which a system administrator may select in defining a computer system's security profile has increased as well. Indeed, the process of selecting which rules should be included in the computer system's security profile can be a tedious and time consuming process. Furthermore, if the system administrator is not familiar with the ramifications of selecting many of the rules, then it can be difficult for the system administrator to select the appropriate set of rules that provides the computer system with the desired level of security.

Indeed, the system administrator after selecting and implementing a particular security profile often changes which rules are included in the security profile. Such changes may have been necessitated by the system administrator's inability to initially define the desired level of security or may have been necessitated by changing security needs. In changing the computer system's security profile, the administrator may make mistakes. In this regard, the system administrator, due to human error or due to the administrator's lack of understanding the ramifications of the changes, may mistakenly add undesirable rules and/or remove desirable rules, thereby changing the security profile in an undesirable way.

Attempting to discover and remedy the undesirable effects introduced by the system administrator in changing the security profile can be difficult and/or time consuming. In this regard, the system administrator typically traverses through the list of selected and/or unselected rules in order to determine why the security application is not behaving as intended. However, understanding the ramifications of whether or not particular rules are selected is paramount in such a debugging process, and not all system administrators are familiar enough with the security application in order to make well informed decisions in debugging and/or changing the security profile. Further, in some situations, it is possible that the errors introduced by changing the security profile lock authorized users and even the system administrator out of the computer system and/or the security application, thereby making the process of correcting for the administrator's mistakes even more difficult and problematic.

Thus, a heretofore unaddressed need exists in the industry for providing a system and method of enabling a system administrator to correct for undesirable effects introduced when the security profile of a computer system is changed.

SUMMARY OF THE INVENTION

The present invention overcomes the inadequacies and deficiencies of the prior art as discussed hereinbefore. Generally, the present invention provides a system and method for recovering a security profile of a computer system.

In architecture, the system of the present invention utilizes memory and a security application. Initially, the security application enables a user to define a first security profile. After defining the first security profile, the user submits a request for activating the first security profile, and in response, the security application modifies a machine state of the computer system. The modification of the machine state in response to this request locks down the computer system, thereby implementing the first security profile defined by the user.

Also in response to the request for activating the first security profile, the security application stores, in the memory, data indicative of the machine state so that the first security profile can be again implemented at a later time, if desired. In this regard, after causing a different security profile to be implemented by the computer system, a user may submit a request for changing the security profile of the computer system back to the first security profile. In response to such a request, the security application retrieves the data previously stored in the memory and automatically modifies the machine state so that the first security profile is again implemented by the computer system. As a result, any changes made to the security profile of the computer system since the submission of the aforementioned request for activating the first security profile are effectively nullified.

The present invention can also be viewed as providing a method for locking down resources of a computer system. The method can be broadly conceptualized by the following steps: defining a plurality of rules for locking down a computer system; receiving an input from a user of the computer system; selecting a set of the rules based on the input; causing the computer system to enforce the selected set of rules in response to an activation request; storing data identifying the selected set of rules in response to the activation request; changing which of the plurality of rules are enforced by the computer system; retrieving the data in response to a user request; automatically identifying the selected set of rules based on the retrieved data; and causing the computer system to enforce the selected set of rules in response to the user request.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

In general, the present invention relates to a system and method for enabling a system administrator (i.e., a user authorized to set and/or change the security profile of a computer system) to recover a desired security profile. In this regard, the system administrator activates a particular security profile selected by the system administrator. Data indicative of the security profile is stored in memory in response to activation of the selected security profile. Later, the system administrator changes the security profile in order to increase or decrease the level of security of the computer system. At some point, the system administrator may decide that the changes made to the security profile are undesirable and may want to return to the original security profile. In such a case, the user provides an input to command the computer system to return the security profile back to its original state. In response, the computer system retrieves the data indicative of the security profile when the security profile was first activated, and based on this data, the computer system changes the security profile back to its original settings. Therefore, the security profile is returned back to its original state, thereby effectively removing the changes made to the security profile.

Figure 1:
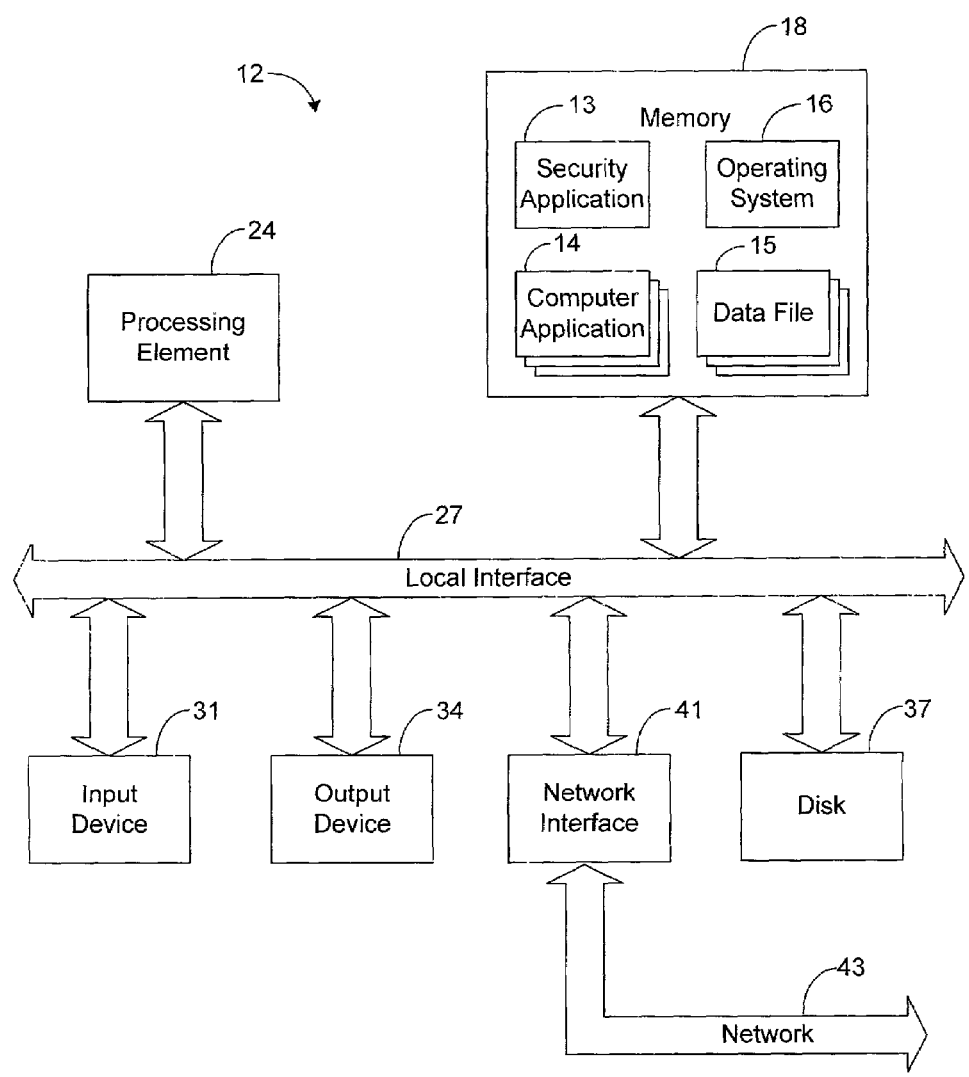
FIG. 1 is a block diagram illustrating a computer system employing a conventional security application.

FIG. 1 depicts a computer system 12 that employs a security application 13 of the prior art. The computer system 12 includes various computer applications 14, data files 15, and an operating system 16 stored in memory 18. The computer applications 14 may comprise any known computer applications for performing any programmed functionality when executed by the computer system 12. Windows NT, Microsoft Outlook, and Microsoft BackOffice are all examples of conventional computer applications that may comprise the computer applications 14 shown by FIG. 1. The operating system 16, via well-known techniques, is configured to control the operation and resources of the computer system 12. A primary function of the operating system 16 is to control when the instructions of applications 13 and 14 are executed by controlling when these instructions are interfaced with a processing element 24, such as a digital signal processor (DSP) or a central processing unit (CPU), for example.

Through well-known techniques, the processing element 24 is configured to execute the instructions transmitted to it. In executing these commands, the processing element 24 may communicate to and drive the other elements within the system 12 via a local interface 27, which can include one or more buses. Furthermore, an input device 31, for example, a keyboard or a mouse, can be used to input data from a user of the system 12, and an output device 34, such as a screen display or a printer, can be used to output data to the user. A disk storage mechanism 37 can be connected to the local interface 27 to transfer data to and from a nonvolatile disk (e.g., magnetic, optical, etc.). The system 12 can be connected to a network interface 41 that allows the system 12 to exchange data with a network 43.

The security application 13 includes data that defines a list of security rules for preventing unauthorized access and/or modification of certain applications 14, files 15, and/or other resources within the computer system 12. In other words, the security application 13 includes data that defines a list of security rules for locking down the computer system 12. For example, one of the rules, when enforced, may prevent a certain class of user from accessing a particular application 14. Other examples of rules typically included in lists defined by conventional security applications 13 for locking down a computer system 12 are well-known in the art and will not be described in detail herein.

When invoked for the first time, the security application 13 normally provides a list of options, via output device 34, to the user of the system 12. This user is normally considered to be a system administrator (i.e., a user authorized to set and/or change the security profile of the system 12). One of the displayed options is to enable selection of a new security profile to be implemented by the security application 13. Upon selection of this option, the security application 13 is configured to display to the system administrator, via output device 34, a list of the security rules defined by the data within the security application 13. The system administrator may analyze these rules and select the rules that he or she would like to have enforced. Note that one of the rules usually selected is to allow only a certain class of user to modify the security profile. Therefore, only the system administrator and/or users designated by the system administrator may normally make changes to the selected security profile once the security profile is activated.

After each desired rule has been selected, the system administrator preferably inputs, via input device 31, a request for activating the selected profile or, in other words, for enforcing the rules selected by the user. Upon receiving this input, the security application 13 changes the configuration of the computer system 12 such that the computer system 12 begins enforcing the selected rules. In other words, the security profile selected by the system administrator is activated.

More specifically, the security application 13, in response to the activation request, is configured to change the machine state of the computer system 12 such that the selected rules are enforced by the operating system 16 during operation of the system 12. As known in the art, the machine state of a computer system 12 refers to mathematical values stored within the computer system 12 that indicate the computer system's current status. As an example, the machine state includes, but is not limited to, the values of the computer system's flags, registers, and counters. Some of the values of the machine state pertain to and control security within the computer system 12.

For example, one of the registers (not shown) within the computer system 12 may include a value or a flag indicative of whether any access restrictions to a particular application 14 or file 15 exist. When the system administrator has selected, via security application 13, a rule for restricting access to this particular application 14 or file 15, the security application 13, upon activation, changes the foregoing value within the register such that the value indicates that access to the particular application 14 or file 15 has been restricted. The security application 13 may also store in the register or other location data indicative of which users are authorized to access the application 14 or file 15 or indicative of which users are restricted from accessing the application 14 or file 15.

Before invoking or retrieving the particular application 14 or file 15, the operating system 16 analyzes the foregoing register to determine whether or not to access the particular application 14 or file 15. If the register indicates that access is not restricted, then the operating system 16 invokes or retrieves the application 14 or file 15. However, if the register indicates that access is restricted, then the operating system 16 takes further steps to determine whether or not the requesting user is authorized to access the application 14 or file 15. More specifically, the operating system 16 analyzes the data previously stored by the security application 13 that indicates which users are authorized to access or prevented from accessing the particular application 14 or file 15, and based on this data, the operating system 16 either accesses or refrains from accessing the particular application 14 or file 15.

Note that in the foregoing example, the security application 13 performs no functionality once the machine state is set by the security application 13. In this regard, the security application 13 merely sets the machine state of the computer system 12 such that the operating system 16, via normal operation, enforces the rule selected for enforcement.

Furthermore, the foregoing example is presented for illustrative purposes. The enforceability of various other rules may be controlled by controlling the machine state according to various other techniques. Such techniques are well-known in the art and will not be described in detail herein.

After the system administrator selects and activates a security profile, the system administrator may decide to change the security profile. In this regard, the system administrator may invoke the security application 13 and then select an option for modifying the current security profile. In response, the security application 13 displays to the system administrator the list of rules that are presently being enforced and the list of rules that are presently not being enforced. The system administrator then selects, via input device 31, which of these rules to add to the security profile and/or which of these rules to remove from the security profile. Then, the system administrator inputs an activation request to activate the security profile, as changed by the system administrator. In response, the security application 13 changes the machine state of the computer system 12 as necessary in order to implement the security profile, as changed by the system administrator.

Unfortunately, the changes to the security profile do not always cause the computer system 12 to behave as expected by the system administrator. Indeed, changes that increase the security of the system 12 sometimes make the system 12 unexpectedly more difficult to operate since the compatibility of the system 12 is often decreased as the security of the system 12 is increased. Typically, in order to get the system 12 to behave in a desirable manner after making changes to the security profile, the system administrator again attempts to change the security profile by adding rules to the security profile and/or by removing rules from the security profile. As set forth hereinabove in the Background of the Invention section, this process of correcting the security profile to achieve a desired effect can be difficult and time consuming, particularly when the system administrator is unfamiliar with the ramifications of adding and/or removing certain rules to and/or from the security profile. Indeed, it can be very difficult in some instances for the system administrator to undo or correct some of the changes made to the security profile. This can be a significant drawback to the system 12, particularly when the changes to the security profile cause the system 12 to unexpectedly behave in an undesirable way.

In the present invention, the system administrator is given the option to return a security profile of a computer system back to the state that existed prior to changing the security profile. Therefore, if changes to the security profile make the computer system behave in an undesirable way, the system administrator can easily remove the changes and return the security profile back to its state that existed prior to the changes.

Figure 2:
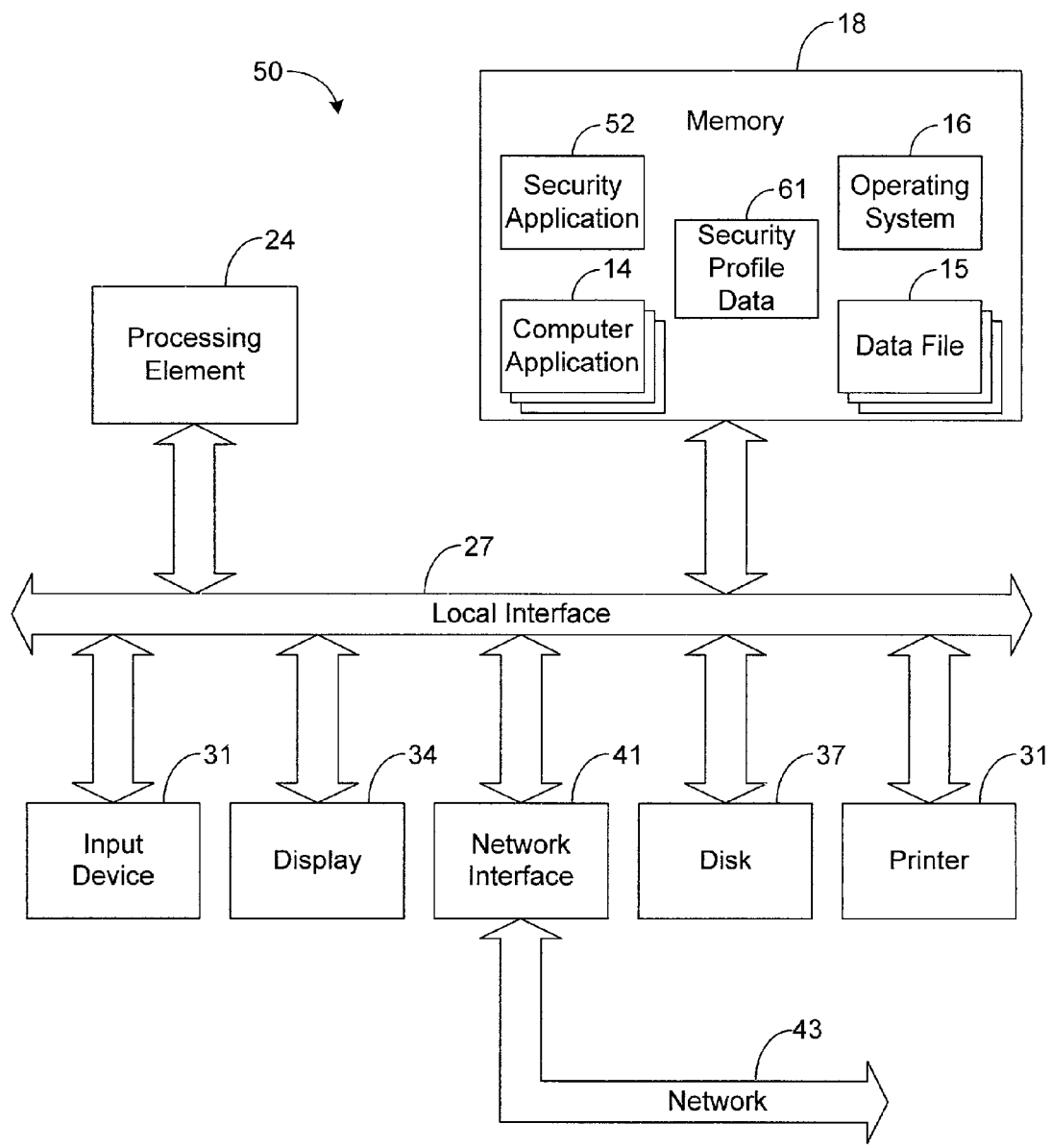
FIG. 2 is a block diagram illustrating a computer system employing a security application in accordance with the principles of the present invention.

FIG. 2 depicts a computer system 50 that may be employed to implement the present invention. Similar to conventional computer system 12, system 50 includes one or more computer applications 14 and data files 15 stored in a memory 18 along with an operating system 16. The operating system 16 via conventional techniques controls the operation and the resources of the system 16 and, in particular, controls the interfacing of instructions with a processing element 24.

The system 50 also includes a security application 52 configured in accordance with the principles of the present invention. The security application 52 can be implemented in software, hardware, or a combination thereof In the preferred embodiment, as illustrated by way of example in FIG. 2, the security application 52 of the present invention along with its associated methodology is implemented in software and stored in memory 18.

Note that the security application 52, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the security application 52 may be magnetically stored and transported on a conventional portable computer diskette.

As in conventional computer system 12, the processing element 24 of the system 50 may communicate to and drive the other elements within the system 50 via a local interface 27, which can include one or more buses. Furthermore, an input device 31, for example, a keyboard or a mouse, can be used to input data from a user of the system 50, and an output device 34, such as screen display or a printer, can be used to output data to the user. A disk storage mechanism 37 can be connected to the local interface 27 to transfer data to and from a nonvolatile disk (e.g., magnetic, optical, etc.). The system 50 can be connected to a network interface 41 that allows the system 50 to exchange data with a network 43.

Similar to conventional security application 13, the security application 52 includes data that defines a list of security rules for preventing access and/or modification of certain applications 14, data files 15, and/or other resources within the computer system 12. The list of rules defined by the security application 52 may be the same list of rules defined by conventional security application 13. When invoked, the security application 52 provides a list of options, via output device 34, to the user of the system 50. The user that initially invokes the security application 52 is considered to be a system administrator.

To enable selection of a security profile, the security application 52 displays, via output device 34, the list of security rules defined by the security application 52. The list of rules may be categorized as taught in copending U.S. patent application Ser. No. 09/760,236 entitled, "System and Method for Categorizing Security Profile Rules within a Computer System," filed on even date herewith, which is incorporated herein by reference. Similar to conventional system 12, the system administrator, via input device 31, selects which rules should be enforced and which rules should not be enforced upon activation of the security profile being defined by the system administrator.

After each desired security rule has been selected, the system administrator inputs, via input device 31, an activation request for activating the security profile being defined by the system administrator. In response, the security application 52 modifies the machine state of the computer system 50 such that the security rules selected by the system administrator are enforced by the computer system 50 (e.g., by operating system 16) during any subsequent operation until the security profile is later changed. The techniques used to update the machine state should be similar to the techniques employed by conventional security application 13 in updating the machine state of conventional system 12.

Note that to facilitate the selection of security rules by the system administrator, the security application 52 preferably enables the system administrator to select a default level of security protection. For example, in one embodiment, the system administrator is given the option to select one of four default levels of security protection: "blank protection," "low protection," "medium protection," and "high protection." Note that other default levels of protection may be implemented in other embodiments.

When the default level of "blank protection" is selected by the system administrator, each security rule is disabled by default. As used herein, a rule is "disabled" by indicating that the rule is not selected for enforcement by the system 50, and a rule is "enabled" by indicating that the rule is selected for enforcement by the system 50. Thus, to define a desired level of protection after selecting the default level of "blank protection," the system administrator manually selects, via input device 31, each security rule that is to be enforced upon activation of the security profile being defined by the system administrator. In other words, the system administrator manually controls which rules are enabled and, therefore, enforced upon activation of the security profile. If a security rule is not manually enabled (i.e., selected for enforcement) by the system administrator, then the rule remains disabled by default and is not enforced upon activation of the security profile. Thus, when the default level of "blank protection" is selected by the system administrator, the system administrator defines the security profile through techniques similar to those used to define the security profile of conventional system 12.

When the default level of "low protection" is selected by the system administrator, certain rules are enabled by default, and the remainder of the rules are disabled by default. In this regard, the programmer of the security application 50 attempts to guess which rules a system administrator would want enabled if the system administrator only wants a low level of security for a computer system. The programmer then programs the security application 52 such that only the rules that provide security without significantly affecting compatibility, in the opinion of the programmer, are enabled by default. If the system administrator is aware of certain security rules that he or she would like enabled or disabled, then the system administrator may manually enable or disable these rules via input device 31. The rules that are not manually enabled or disabled by the system administrator maintain their default status. Thus, when the system administrator inputs the activation request, the only security rules included in the security profile and, therefore, enforced by the system 50 are the security rules: (1) manually enabled by the system administrator or (2) enabled by default and not manually disabled by the system administrator. As a result, it is not necessary for the system administrator to analyze each security rule to determine whether or not he or she would like the rule enabled or disabled. Instead, the system administrator may choose to manually control the status of security rules of particular interest to the system administrator and to rely on the selections of the programmer for the rules that the system administrator is either less interested in or less familiar with.

The remaining levels of protection (i.e., "medium protection" and "high protection") are similar to the level of "low protection" in that the programmer enables certain rules by default and disables certain rules by default. However, the programmer should program the security application 52 such that a different set of rules is enabled by default for each level of protection. For example, the programmer preferably enables by default more rules for "medium protection" than for "low protection," and the programmer preferably enables by default more rules for "high protection" than for "medium protection." Thus, as described above for "low protection," only security rules that do not significantly impact compatibility may be enabled by default. However, for "medium protection," the programmer may assume that the system administrator is more concerned with security and, therefore, more security rules that significantly impact compatibility may be enabled by default. The programmer may further assume that the system administrator in selecting "high protection" may be particularly concerned with security and, therefore, each security rule that significantly improves security may be enabled by default regardless of the rule's impact to compatibility. It is possible for each rule to be enabled by default when the system administrator selects the default level of "high protection." In any event, for each of the latter three default levels of protection (i.e., "low," "medium," and "high"), there is a different set of rules that are enabled by default.

To assist the system administrator in selecting a default level of protection, the programmer may provide to the system administrator information (e.g., a manual) informing the system administrator of the considerations utilized in setting the default status of the rules. Thus, the system administrator, based on the desired degree of security and compatibility, may select one of the default levels of protection and then manually enable or disable each rule of particular interest to the system administrator. Since the system administrator relies on the programmer to set the status of at least some of the rules by default, the burden on the system administrator is reduced. Note that other categories and other numbers of categories may be used to enable and disable different sets of rules by default in other embodiments. Further, as described above, the system administrator may select the level of "blank protection" and manually enable each desired rule if the system administrator for some reason does not want to rely on the default settings established by the programmer for the other default levels of protection.

As described above, once the rules have been appropriately enabled or disabled (i.e., once the security profile has been selected), the system administrator inputs an activation request for activating the security profile defined by the enabled rules of security application 52. In response, the security profile selected by the system administrator is activated. This activation shall be referred to hereafter as the "original activation." In activating the selected security profile during the original activation, the security application 52 modifies the machine state of the system 50 such that the rules enabled at the time of the original activation are enforced and such that the rules disabled at the time of the original activation are not enforced.

Also in response to the foregoing activation request, the security application 52 stores a set of security profile data 61 into memory 18. The set of security profile data 61 is indicative of which security rules are enabled and which rules are disabled at the time of the original activation, and it is, therefore, possible for the security rules enabled during original activation to be identified by analyzing the foregoing set of security profile data 61. In the preferred embodiment, the enforceability of the security rules is controlled by the machine state of the system 50. Thus, the security profile data 61 is indicative of the machine state portions that pertain to the security application rules defined by the security application 52. In other words, the security profile data 61 is indicative of each machine state value that may be controlled based on whether or not any one of the rules defined by the security application 52 is enabled or disabled upon activation. Therefore, at any point in the future, the security profile data 61 may be utilized to set the machine state such that the security application rules enabled at the time of the original activation are enforceable and such that the security application rules disabled at the time of the original activation are not enforceable.

After the original activation, the system administrator may decide to change the security profile. In this regard, the security application 52 may display an option to change the security profile, and the system administrator may select this option to initiate the process of changing the current security profile (e.g., the security profile implemented via the original activation). Upon selection of the foregoing option, the rules of the security application 52 are displayed to the system administrator as described above. Each rule presently being enforced by the system 50 should appear as enabled, and each rule presently not enforced by the system 50 should appear as disabled. The system administrator can then manually change the enabled/disabled status of any rule as desired by the system administrator. Alternatively, the system administrator can select one of the default levels of protection, thereby causing the security application 52 to set the status of each rule according to the default settings of the selected default level of protection, and the system administrator can then manually enable or disable any of the rules as described above. In any event, the system administrator makes changes to the security profile such that different rules are enabled.

Once the rules have been appropriately enabled and/or disabled as desired by the system administrator, the system administrator inputs another activation request. In response, the security profile, as changed by the system administrator, is activated. This activation will be referred to hereafter as the "new activation." Thus, upon occurrence of the new activation, the machine state of the system 50 is modified such that the security application rules enabled according to the security profile, as changed by the system administrator, are enforced by the system 50 Furthermore, the machine state of the system 50 is also modified such that the security application rules disabled according to the security profile, as changed by the system administrator, are not enforced by the system 50.

However, the changes to the security profile may cause certain operational or compatibility problems. Thus, at some point, the system administrator may desire to remove the changes made to the security profile. The foregoing may be accomplished by rebuilding, based on the security profile data 61, the security profile as it existed at the time of the original activation. In this regard, the security profile data 61 should indicate how the values of the machine state of the system 50 should be changed in order to restore the desired security profile (i.e., the security profile implemented via the original activation).

Thus, in response to an input indicating a desire to restore the security profile as it existed at the time of the original activation, the security application 52 is configured to retrieve the security profile data 61. The security application 52 then analyzes the security profile data 61 to determine how to change the machine state such that the security profile previously implemented via the original activation is restored. The security application 52 then automatically changes the current values of the machine state such that the security application rules enabled during the original activation are now enforced by the computer system 50 and such that the security application rules disabled at the time of the original activation are not enforced by the computer system 50. As a result, the security profile implemented via the original activation should be automatically restored in response to the foregoing input entered by the system administrator, thereby effectively removing the changes made to the security profile since the original activation.

Note that is not necessary for the "original activation" to be the penultimate activation of the security profile. In this regard, the security profile can be changed any number of times from the original activation before the settings of the original activation are restored as described above. Furthermore, it is also not necessary for the "original activation" to be the first security profile activation. In this regard, the system administrator may initially activate a first security profile. Then, the system administrator may change the security profile being implemented. The activation of this changed security profile may constitute the "original activation" such that this changed security profile is the security profile that is restored according to the techniques described hereinabove. Note that the security profile may be changed any number of times between activation of the first security profile and the original activation and between the original activation and the time that the request for restoring the security profile of the original activation is received.

Operation

The preferred use and operation of the computer system 50 and associated methodology are described hereafter.

Figure 3:
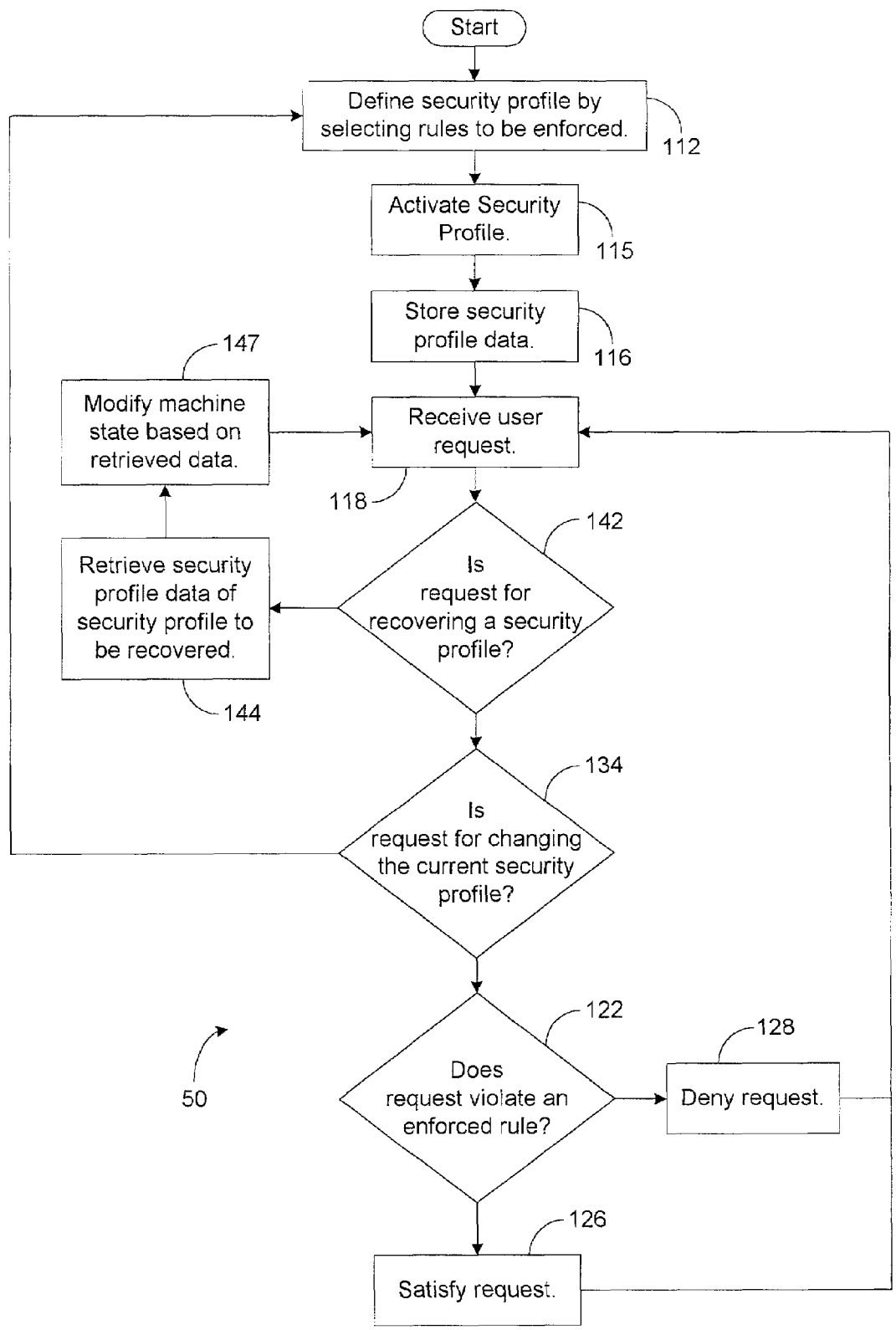
FIG. 3 is a flow chart illustrating the architecture and functionality of the computer system depicted in FIG. 2.

Initially, the system administrator invokes the security application 52, which displays a list of rules to the system administrator. In block 112 of FIG. 3, the system administrator selects from the list which rules the system administrator would like the system 50 to enforce. As described above, the system administrator may manually select each rule that is to be enforced. Alternatively, the rules to be enforced may be selected by default based on the level of security desired by the system administrator. If the rules are selected by default, the system administrator may have the option to manually change whether one or more of the rules is selected for enforcement or, in other words, is enabled.

After selecting which of the rules should be selected for enforcement, the system administrator submits an activation request to indicate that the rules selected for enforcement in block 112 should be enforced by the system 50. In response, the security application 52 modifies the machine state of the system 50, in block 115, such that the rules selected in block 12 are enforced by the system 50. Once the machine state has been modified by the security application 52, the security application 52, in block 116, stores a set of security profile data 61 into memory 18. This set of security profile data 61 is indicative of the present machine state (i.e., the machine state as just modified via block 115) so that the security profile defined by the present machine state can be recovered at a later time upon request by the system administrator.

As shown by block 118, a user of the system 50 may periodically submit requests for the performance of various tasks by the system 50. As shown by blocks 122 and 126, these tasks may be performed by the system 50 provided that the tasks do not violate any of the security application rules presently being enforced by the system 50. However, as shown by block 128, if the requested task violates one of these security application rules, the system 50 denies the user's request. The system 50 may display a message to the user explaining that the request has been denied and possibly providing information as to why the request has been denied.

At some point, the system administrator may decide to change the security application rules being enforced by the system 50 or, in other words, to change the security profile of the system 50. Thus, the system administrator may submit a request to change the security profile. Such a request is detected in block 134, and in response to such a request, blocks 112, 115, and 116 are repeated. In this regard, the system administrator is allowed to select, in block 112, which rules are to be enforced by the system 50. In other words, the system administrator is allowed to define a new security profile. In implementing block 112 in this example, the security application 52 may display one or more of the security application rules and the rules presently being enforced by the system 50 may be so indicated. The system administrator may then manually change the status of one or more of the rules such that a different set of the rules are selected for enforcement. Alternatively, the rules selected for enforcement may be selected via any technique described hereinbefore or via any conventional technique for selecting security application rules for enforcement. In any event, the system administrator, in block 112, defines a new security profile by enabling the system administrator to select a different set of security application rules for enforcement by the system 50.

Once the new security profile has been defined, the new security profile is activated in block 115. In performing block 115, the security application 52 changes the machine state of the computer system 50 to cause the system 50 to begin enforcing the selected rules of the new security profile. Furthermore, in block 116, the security application 52 also stores in memory 18 a set of security profile data 61 indicative of the present machine state (i.e., the machine state modified according to the new security profile). This set of security profile data 61 may be utilized at a later time to recover the foregoing security profile upon request by the system administrator. Upon completion of block 115, the security profile has been changed in response to the request detected in block 134. Note that the system administrator can change the security profile in this way any number of times.

At some point, the system administrator may decide that a previously activated security profile is more preferable than the one presently implemented by the system 50. Thus, the system administrator may submit a request to change the security profile of the system 50 back to a security profile previously implemented by the system 50 or, in other words, to recover the security profile previously implemented by the system 50. Such a request is detected by the system 50 in block 142. In response to the request, the security application 52 retrieves the security profile data 61 that is indicative of the machine state that existed when the system 50 previously activated the desired security profile, as shown by block 144. Based on the retrieved security profile data 61, the security application 52 changes the current machine state of the system 50 such that the desired security profile is now implemented by the system 50. More specifically, the security application 52 changes the machine state such that the rules enforced via the previous activation of the desired security profile are now enforced by the system 50. As a result, the security profile of the system 50 is automatically changed to the desired security profile in response to the request submitted by the system administrator.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system comprising:
   memory; and
   a security application configured to lock down resources of said computer system by modifying a machine state of said computer system in response to a request for activating an original state of a security profile for a user, said security application configured to store data indicative of said machine state in said memory, said security application configured to modify said machine state in response to a request for activating a new state of said security profile for said user, said security application configured to retrieve said data in response to a request for recovering said original state of said security profile and to modify said machine state based on said retrieved data thereby activating said original state of said security profile for said user.

2. The system of claim 1, wherein said security application includes default data defining default levels of security, wherein said security application enables a user to select one of said default levels of security, and wherein said security application is configured to modify said machine state in response to said request for activating said original state of said security profile based on said selected default level of security.

3. The system of claim 2, wherein said security application defines a plurality of rules for locking down said computer system, wherein said security application configured to enable ones of said rules based on which of said default levels is selected by said user, and wherein said security application is further configured to cause said computer system to enforce each enabled rule within said plurality of rules by modifying said machine state in response to said request for activating said original state of said security profile.

4. The system of claim 3, wherein said security application enables said user to change which of said rules are enabled.

5. A computer system, comprising: memory; and
   a security application defining a plurality of rules, said security application configured to enable a user to select a set of said rules to define an original state of a security profile for a user, said security application configured to lock down said computer system by causing said computer system to enforce said selected set of rules in response to an activation request, said security application further configured to store data indicative of said original state of said security profile, said security application configured to change said security profile for said user from said original state to a new state by changing which of said plurality of rules are enforced by said computer system based on inputs to said computer system, said security application configured to retrieve said data in response to a user request and to automatically identify said set of rules based on said retrieved data, said security application further configured to return said security profile for said user to said original state thereby causing said computer system to enforce said identified rules in response to said user request.

6. The system of claim 5, wherein said security application is further configured to define multiple sets of default data, each of said sets of default data identifying different ones of said rules as being enabled for enforcement, said security application configured to enable said user to select one of said sets of default data and to determine which of said rules are selected for inclusion into said selected set of rules based on which of said rules are indicated as enabled.

7. The system of claim 6, wherein said security application enables said user to change which of said rules are indicated as being enabled.

8. A computer system comprising:

means for storing data; and means for locking down resources of said computer system by modifying a machine state of said computer system in response to a request for activating an original state of a security profile for a user, said locking down means including a means for storing security profile data indicative of said machine state in said memory in response to said request for activating said original state of said security profile, said locking down means including a means for modifying said machine state in response to a request for activating a new state of said security profile for said user, said locking down means including a means for retrieving said security profile data in response to a request for recovering said original state of said security profile and for modifying said machine state based on said retrieved data thereby activating said original state of said security profile for said user.

9. A method for locking down resources of a computer system, comprising:

receiving a request for activating a an original state of a security profile for a user;

modifying a machine state of said computer system in response to said request for activating said original state of said security profile;

storing data indicative of said machine state;

modifying said machine state in response to a request for activating a new state of said security profile for said user;

retrieving said data in response to a request for recovering said original state of said security profile; and modifying said machine state based on said retrieved data in response to said request for recovering said first security profile.

10. The method of claim 9, further comprising:

defining default levels of security; and selecting one of said default levels of security, wherein said modifying that is performed in response to said request for activating said original state of said security profile is based on said selecting.

11. The method of claim 10, further comprising:

defining a plurality of rules for locking down said computer system;

associating each of said default levels of security with different ones of said rules;

enabling ones of said rules based on which of said rules are associated, via said associating step, with said default level selected in said selecting; and enforcing each of said rules enabled via said enabling based on said machine state as modified via said modifying that is performed in response to said request for activating said original state of said security profile.

12. The method of claim 11, further comprising:

enabling a user to change which of said rules are enabled.

13. A method for locking down resources of a computer system, comprising:

defining a plurality of rules for locking down said computer system;

receiving an input from a user of said computer system;

selecting a set of said rules based on said input;

causing said computer system to enforce said selected set of rules in response to an activation request;

storing data identifying said selected set of rules in response to said activation request;

changing which of said plurality of rules are enforced by said computer system;

detecting an operational problem caused by said changing;

providing a request to change a security state of said computer system in response to said detecting;

retrieving said data in response to said request to change said security state;

automatically identifying said selected set of rules based on said retrieved data; and causing said computer system to enforce said selected set of rules in response to said request to change said security state.

14. The method of claim 13, further comprising:

defining multiple sets of default data, each of said sets of default data identifying different ones of said rules as being enabled; and selecting one of said sets of default data, wherein said selecting a set of said rules is further based on which of said sets of default data is selected via said selecting one of said sets of default data.

15. The system of claim 1, wherein said original state grants access to a particular resource of said computer system based on a user identifier, and wherein said new state denies access to said particular resource based on said user identifier.

16. The system of claim 1, further comprising an operating system configured to read said machine state modified by said security application and to control access to at least one resource of said computer system based on said machine state.

17. The computer system of claim 16, wherein said machine state read by said operating system comprises a flag indicative of whether access to said at least one resource is restricted.

18. The computer system of claim 17, wherein said operating system is configured to analyze, in response to said flag, data indicating which users are authorized to access said at least one resource.

19. The system of claim 1, wherein said security application, by activating said original state in response to said request for recovering said original state, enables said user to undo an error in defining said new state of said security profile for said user.

20. The method of claim 9, further comprising:

detecting an operational problem caused by activation of said new state of said security profile; and providing said request for recovering said original state of said security profile in response to said detecting.

21. The method of claim 9, wherein said storing is in response to said request for activating said original state of said security profile.

22. A computer system, comprising:

memory; and a security application configured to define a security profile for controlling access to at least one resource of said computer system, said security application configured to activate an original state of said security profile and to store data indicative of said original state in said memory, said security application further configured to activate a new state of said security profile in response to a user request, said security application further configured to enable a user to undo an error in defining said new state by allowing said user to initiate activation of said original state based on said data.

* * * * *

UNITED STATES PATENT AND TRADEMARK OFFICE
CERTIFICATE OF CORRECTION

| | | |
|---|---|---|
| PATENT NO. | : 7,181,618 B2 | Page 1 of 1 |
| APPLICATION NO. | : 09/760404 | |
| DATED | : February 20, 2007 | |
| INVENTOR(S) | : William T. Daniell et al. | |

It is certified that error appears in the above-identified patent and that said Letters Patent is hereby corrected as shown below:

In column 12, line 35, delete "12" and insert -- 112 --, therefor.

In column 15, line 22, in Claim 9, after "activating" delete "a".

Signed and Sealed this

Fourth Day of August, 2009

JOHN DOLL
*Acting Director of the United States Patent and Trademark Office*